United States Patent
Bailey et al.

(10) Patent No.: US 7,167,470 B2
(45) Date of Patent: Jan. 23, 2007

(54) METHOD AND APPARATUS FOR LOCATING A COMMUNICATION DEVICE USING LOCAL AREA NETWORK SWITCH INFORMATION

(75) Inventors: William B. Bailey, Phoenix, AZ (US); Edward W. Swanson, Phoenix, AZ (US); Fred Bishop, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 998 days.

(21) Appl. No.: 10/099,509

(22) Filed: Mar. 15, 2002

(65) Prior Publication Data

US 2002/0150086 A1 Oct. 17, 2002

Related U.S. Application Data

(60) Provisional application No. 60/276,204, filed on Mar. 15, 2001.

(51) Int. Cl.
*H04L 12/66* (2006.01)

(52) U.S. Cl. .............. 370/352; 370/356; 455/404.2; 455/456.1

(58) Field of Classification Search ........ 370/351–356, 370/389, 401; 455/404.1, 404.2, 521, 456.1
See application file for complete search history.

(56) References Cited

U.S. PATENT DOCUMENTS

| | | | |
|---|---|---|---|
| 5,185,860 A | 2/1993 | Wu | |
| 5,437,046 A | 7/1995 | Bright et al. | |
| 5,526,489 A | 6/1996 | Nilakantan et al. | |
| 5,754,767 A | 5/1998 | Ruiz | |
| 5,850,388 A | 12/1998 | Anderson et al. | |
| 5,946,308 A | 8/1999 | Dobbins et al. | |
| 5,966,513 A | 10/1999 | Horikawa et al. | |
| 5,978,845 A | 11/1999 | Reisacher | |
| 5,982,753 A | 11/1999 | Pendleton et al. | |
| 5,987,516 A | 11/1999 | Rao et al. | |
| 6,014,699 A | 1/2000 | Ratcliff et al. | |
| 6,044,468 A | 3/2000 | Osmond | |
| 6,052,725 A | 4/2000 | McCann et al. | |
| 6,058,423 A | 5/2000 | Factor | |

(Continued)

OTHER PUBLICATIONS

Cisco Systems Seminar Materials dated Feb. 2002 entitled "Cisco ER Emergency Responder" by Scott Keagy.

*Primary Examiner*—Ajit Patel
(74) *Attorney, Agent, or Firm*—Fitzpatrick, Cella, Harper & Scinto

(57) ABSTRACT

The present invention includes a system and method for using Local Area Network (LAN) switch information of an internet protocol phone to determine the location of the internet protocol phone. The internet protocol phone communicates with a server and receives a dynamic internet protocol address. The internet protocol phone further communicates with a second server to receive LAN switch information for the internet protocol phone. The internet protocol phone transmits the dynamic internet protocol address and LAN switch information to a phone management module. The phone management module queries a LAN switch in order to gather further LAN switch information for the internet protocol phone. The phone management module transmits the dynamic internet protocol address and LAN switch information to a third party in order to more accurately determine the location of a user using the internet protocol phone.

17 Claims, 2 Drawing Sheets

U.S. PATENT DOCUMENTS

| | | |
|---|---|---|
| 6,081,900 A | 6/2000 | Subramaniam et al. |
| 6,094,682 A | 7/2000 | Nagasawa |
| 6,115,545 A | 9/2000 | Mellquist |
| 6,131,117 A | 10/2000 | Clark et al. |
| 6,157,950 A | 12/2000 | Krishnan |
| 6,188,691 B1 | 2/2001 | Barkai et al. |
| 2003/0133450 A1* | 7/2003 | Baum .......................... 370/389 |
| 2003/0211839 A1* | 11/2003 | Baum et al. ................. 455/403 |
| 2003/0225893 A1* | 12/2003 | Roese et al. ................. 709/227 |
| 2004/0111640 A1* | 6/2004 | Baum .......................... 713/201 |
| 2005/0083966 A1* | 4/2005 | Zodnik ........................ 370/463 |
| 2005/0249207 A1* | 11/2005 | Zodnik ........................ 370/389 |

* cited by examiner

METHOD AND APPARATUS FOR LOCATING A COMMUNICATION DEVICE USING LOCAL AREA NETWORK SWITCH INFORMATION

RELATED APPLICATIONS

This patent application claims priority to, and the benefit of, the U.S. provisional patent application entitled "EMERGENCY IP TELEPHONY" filed on Mar. 15, 2001 as U.S. Ser. No. 60/276,204, which is hereby incorporated by reference.

FIELD OF INVENTION

The present invention generally relates to locating a communication device, and more particularly, to a system and method for using Local Area Network switch information to locate a communication device.

BACKGROUND OF THE INVENTION

In the United States, the digits 9-1-1 are designated as the emergency telephone number and enhancements to the 911 system typically enable the caller's telephone number to be displayed to the Public Safety Answering Point (PSAP). As a result, when the caller is calling from a single line telephone using the Enhanced 911 system, the address associated with the caller's telephone number can be retrieved and usually provides a reasonably precise identification of the caller's location. Public safety agencies rely on the Enhanced 911 system to provide dependable and precise information about the caller's location and a reliable number to call back in order to reach the caller.

In some cases, emergency calls made from telephones connected to a multi-line telephone system (MLTS) may not be precisely located by the Enhanced 911 system, thereby eliminating some of the benefits of the Enhanced 911. The lack of adequate location information can be life threatening if the caller cannot supply the correct location.

Moreover, insufficient public safety resources may be dispatched and considerable disruption in business operations may be experienced from the public safety personnel attempting to locate the caller.

Further, in a private network environment (e.g., campus environment), internet protocol telephony cannot locate a user because the user may simply plug his phone into any network jack and obtain a dynamically assigned internet protocol address while maintaining the assigned phone number, so the specific location of the individual is unknown. Current technology allows for merely the Billed To Number (BTN) and address of the point of presence (e.g., a commercial building on a campus environment, an off campus location, and/or the like), where the trunk group terminates, to be sent to the PSAP (a trunk group is a collection of phone access lines to provide service to MLTS). As such, local security staff at a main entrance often direct paramedical staff to the call source, if known. Alternatively, the caller can contact local security and/or the direct call to Enhanced 911 can include the caller identifying their location to the authorities in order to avoid the authorities having to search the entire building.

Along with potential complications from Enhanced 911 calls placed from MLTS, people are increasingly using internet protocol (IP) telephones to access emergency services. These additional devices for accessing Enhanced 911 services raise other concerns, for example, the devices are either not found in any permanent location or can be plugged into any one of many locations within a large structure, campus, or area. Particularly, with internet protocol telephony, the user has the ability to plug into any network jack and obtain a dynamically assigned internet protocol address while maintaining her assigned telephone number. As such, when the caller uses the internet protocol telephony, the specific location of the individual may not be available to the Enhanced 911 dispatch center.

Thus, a system and method for more accurately locating a person using a communication device (e.g., an internet protocol phone) is desirable.

SUMMARY OF THE INVENTION

The present invention includes a system and method for using Local Area Network (LAN) switch information to locate a communication device. After connecting the communication device to a network jack, the communication device communicates with a service for assigning a protocol address to the communication device. A communication device management module communicates with the communication device for registering the communication device with the communication device management module. The communication device management module receives LAN switch information from the communication device via the service such that the LAN switch information may be further transmitted to a third party in order to locate the communication device.

BRIEF DESCRIPTION OF THE DRAWINGS

The subject invention will hereinafter be described in the context of the appended drawing figures, wherein like numerals denote like elements, and.

DETAILED DESCRIPTION OF EXEMPLARY EMBODIMENTS

Figure 1:
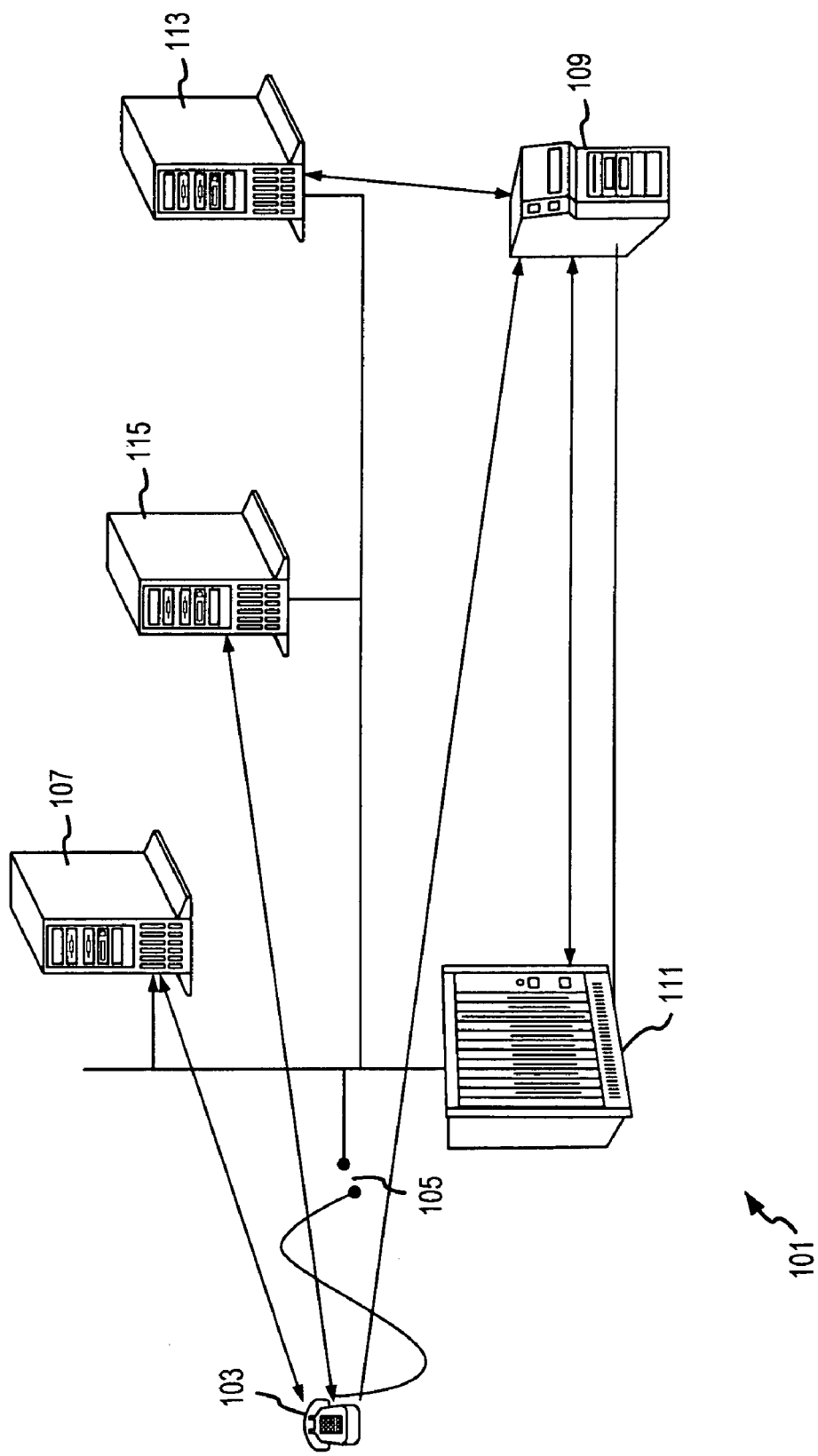
FIG. 1 illustrates a communication system for using Local Area Network (LAN) switch information of a communication device to determine a location of the communication device in accordance with an exemplary embodiment of the present invention.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices or processes. Similarly, the software elements of the present invention may be implemented with any programming or scripting language such as Basic, C, C++, Java, COBOL, assembler, PERL, with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to validate data with a user-side scripting language, such as JavaScript, VBScript or the like.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described herein with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

It should be appreciated that the particular implementations shown and described herein are illustrative of the invention and its best mode and are not intended to otherwise limit the scope of the present invention in any way. Indeed, for the sake of brevity, conventional data networking, standard telephony protocols, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

To simplify the description of the exemplary embodiments, the present invention is described as pertaining to the Enhanced 911 system using the Public Safety Answering Point (PSAP). It will be appreciated, however, that many applications of the present invention could be formulated. For example, the system could be used in other emergency response operations, security operations, military operations, directory maintenance, hotel directory and operations, locating people using badge readers, locating computer criminals (e.g., hackers), locating other criminals (e.g., stockers, child molesters), and/or the like. The system may also be used in any other application where locating a communication device is useful.

In the context of an Enhanced 911 system using a multi-line telephone system (MLTS), the National Emergency Number Association (NENA) has recently released model legislation regarding E-911/MLTS. The legislation requires that employers utilizing MLTS configurations (other than KeySystems) located in work spaces of 7000 square feet or more must either: (1) send the building address and floor location information of a calling station to the PSAP; (2) provide a direct emergency response by the establishment of a private answering point (e.g., campus security); or (3) provide a connection to a switchboard operator who can direct emergency personnel to the calling station and simultaneously send the call to the PSAP. All newly installed MLTS would be required to meet these requirements within two years of enactment and all existing MLTS would be required to meet these requirements within seven years of enactment. As such, the present invention may aid in achieving one or more of the E-911/MLTS model legislation requirements.

A communication system 101 for using Local Area Network (LAN) switch information of a communication device to determine a location of the communication device in accordance with an exemplary embodiment of the present invention is illustrated in FIG. 1. Communication system 101 includes a communication device 103 coupled to or otherwise in communication with a network jack 105. Communication device 103 communicates with a server 107 via network jack 105 in order to receive a protocol address (e.g., a dynamically assigned internet protocol address, a known protocol address, and/or the like). Communication device 103 includes any phone, any internet protocol phone, any phone using a known protocol, any communication device having internet protocol capability, any device having a known protocol capability, a laptop computer, a card reader, any network aware device, a printer, a biometric device or scanner, a personal digital assistant, a protocol analyzer, and/or the like. Network jack 105 includes any phone jack, any internet protocol network jack, any communication jack having a known protocol capability, any wireless device, any wireless bridge device (e.g., Bluetooth, WI-Fl, 802.11A, 802.11B), any device providing physical network access, and/or the like.

Communication device 103 communicates with a communication device management module 109 via network jack 105 in order to register communication device 103 with communication device management module 109. Communication device management module 109 may include a phone management module for a telephony system and/or any other management module depending on the needs of communication system 101. Registering communication device 103 with communication device management module 109 includes using the protocol address (e.g., dynamically assigned internet protocol address) and the LAN switch information associated with communication device 103 to store location information for communication device 103 in communication device management module 109. Communication device management module 109 may further store such location information in a server 113 in order to maintain a central storage and retrieval server. For example, server 113 may include a Lightweight Directory Access Protocol (LDAP) server, a server using a known protocol, a server using a storage method, a database, and/or a storage device. Moreover, server 107 may include at least one of a Dynamic Host Configuration Protocol (DHCP) server, a QIP® server, and/or any service for assigning a known protocol (e.g., dynamic internet protocol) address to communication device 103.

In an exemplary embodiment of the present invention, communication system 101 uses a DHCP server 107 to dynamically assign an internet protocol address to communication device 103. Server 107 can also provide the network name and address for a server 115 to communication device 103. Server 115 communicates with communication device 103 and may send, for example, a Trivial File Transfer Protocol (TFTP) file having network name (e.g., of communication device management module 109) and LAN switch information to communication device 103. Any of servers 107, 115, communication device management module 109, and/or communication device 103 may provide the protocol address, network name, and/or LAN switch information for locating communication device 103. Alternatively, permanently assigning a protocol address (e.g., internet protocol address) to communication device 103 makes using servers 107 and/or 115 optional. Once communication device 103 receives the dynamically assigned internet protocol address, the network name, and/or LAN switch information, communication device 103 may register with communication device management module 109. Registration of communication device 103 with communication device management module 109 includes communication device management module 109 querying a Local Area Network (LAN) switch 111 for location information regarding communication device 103.

In order for communication device management module 109 to query LAN switch 111 for information regarding communication device 103, Simple Network Management Protocol (SNMP) may be used. SNMP is merely an exemplary protocol and any suitable management protocol may be used. SNMP was developed to provide a general purpose management protocol. SNMP emphasizes simplicity over power and was built simply for robustness in the event of network failure, low overhead in the devices running the protocol, and ease of debugging the protocol. SNMP includes the User Datagram Protocol (UDP), which allows the user the ability and responsibility to manage lost packets and perform any desired retransmissions. Because SNMP runs continuously, it is desirable for it to consume minimal network resources. SNMP includes three control primitives that initiate data flow from the user (e.g., requester), namely Get, Get-Next and Set. The responder uses two control primitives to reply, namely Get-Response is used in response to the requester's direct query and Trap is an asynchronous response to obtain the requestor's attention. All the primitives are carried by UDP and are typically limited in size by the amount of data that can fit into a single UDP packet. Since UDP allows control over packet transmissions, packet size, and content (packetization), the use of UDP by SNMP is useful. As such, SNMP aids communication device management module 109 in determining location information for communication device 103.

Communication system 101 uses SNMP to associate the protocol address and LAN switch information of communication device 103 with the location of communication device 103. Determining location information for communication device 103 includes using SNMP to determine the LAN switch information associated with communication device 103 in order to locate communication device 103. In this manner, communication device management module 109 may communicate with LAN switch 111 via SNMP to determine location information for communication device 103. More particularly, creation of a Management Information Base (MIB) and/or MIB II on LAN switch 111 and the SNMP query may aid in extracting location information for communication device 103. Communication device 103 also includes a MAC (Media Access Control) address, which is an identifier tied to an externally known phone number in most implementations. The MAC address is mapped to the protocol address (e.g., dynamically assigned internet protocol address) of communication device 103. LAN switch 111 may include a MIB structure that mirrors the MAC address mapped to the protocol address and LAN switch's 111 configuration table having the port number and jack number associated with the MAC address. For example, a MIB structure can be populated by reading contents of machine readable tables (e.g., information contained in Content Addressable Memory) describing the configuration of LAN switch information. As such, communication device management module 109 could query such a MIB in order to gather LAN switch information (including specific LAN switch information, e.g., port number, jack number, MAC address, and/or the like). Those skilled in the art will appreciate that any of servers 107, 113, 115, communication device management module 109, and/or LAN switch 111 may use a MIB with various information depending on the needs of communication system 101.

Once queried by communication device management module 109, LAN switch 111 returns LAN switch information to communication device management module 109. LAN switch information includes at least one of a port number, a jack number, Emergency Response Location information, Billed To Number (BTN), and/or the like. Using the industry standard SNMP, communication system 101 associates a network jack number with the protocol address (e.g., the dynamically assigned internet protocol address) of communication device 103. The network jack number for identifying the location of network jack 105 can be passed in a user field in a user identification record to communication device management module 109. For example, the user identification record may include the Billed To Number (BTN), location information (e.g., internet protocol address, LAN switch information, site address, site building, site floor, site wing, site column, and/or other site specific information), Emergency Response Location information (information usually used by emergency personnel to locate a person or entity), Global Positioning System (GPS) coordinates, and/or the like depending on communication system's 101 needs. Communication device management module 109 may store such information for communication device 103 in server 113. Communication device management module 109 transmits the information in the user identification record of communication device 103 to a third party. Information in the user identification record may also be obtained from server 113 and/or any network device. As such, communication system 101 can automatically provide more accurate internal location information of communication device 103 to a third party.

In an alternate embodiment of the present invention, a MIB structure may be automatically populated with at least one of the protocol address and the LAN switch information. For example, Emergency Response Location (ERL) information can be loaded on LAN switch 11 (e.g., a person loads the physical location of LAN switch 111 through a manual process into the Emergency Response location information field of the MIB structure). As such, the person provides the physical location of network jack 105 to populate the MIB structure.

Alternatively, the location of network jack 105 could be derived from the identifier of network jack 105. For example, the jack number of network jack 105 could include a two character building identifier, a one character floor identifier, a one character section identifier, and/or a four character cube number in connection with the location of network jack 105. LAN switch 111 could translate the jack number of network jack 105 into a physical location using predefined rules in order to populate the MIB structure.

Still alternatively, communication device 103 could be plugged into network jack 105, with the MIB structure and appropriate SNMP queries pre-built to accept updates from communication device 103 (upon installation or update to communication device 103). Communication device 103 could pass an SNMP update message to LAN switch 111 to update the MIB structure with location information (e.g., meeting the requirements of an Emergency Response Location). Communication device 103 could allow a technician to enter the location of network jack 105 (e.g., textual information entered into communication device 103) into the MIB structure. As such, the entered location of network jack 105 could be read into both the MIB structure and server 107. An SNMP query to LAN switch 111 could read the MIB structure and send the location information in a user field of a user identification record to communication device management module 109, PSAP, or other location system.

Even still alternatively, a Global Positioning System (GPS) enabled communication device 103 could be plugged into or otherwise communicate with network jack 105. GPS communication device 103 could pass an SNMP update message to LAN switch 111 to update the MIB structure with location information (e.g., meeting the requirements of an Emergency Response Location). The location information could be stored as a GPS coordinate in the MIB structure. A process running within communication system 101 could translate the GPS coordinate into a location and store the location information in the MIB structure. An SNMP query to LAN switch 111 reads the MIB structure and can send the location to a user field in a user identification record in communication device management module 109.

Still alternatively, network jack 105 could include an integrated GPS capability (e.g., capable of returning the GPS coordinates at any time). An SNMP read message could be sent to an intelligent jack to return a MIB update message with the GPS coordinate location information for communication device 103 (e.g., meeting the requirements of an Emergency Response Location).

Even still alternatively, communication device 103 could pass an SNMP update message to LAN switch 111 to update the MIB structure with additional information other than the location, such as an unique identifier representing the user of communication device 103. Pre-built MIB structure and SNMP queries can accept updates from communication device 103 upon insertion of communication device 103 into network jack 105. As such, the user identifier could be read into both the MIB structure in LAN switch 111 and communication device management module 109 from communication device 103. An SNMP query to LAN switch 111 could read the MIB structure and send the identification information to update the user identification record in communication device management module 109. In cases where communication device 103 is shared or moved, the PSAP will be able to provide not just the location of the emergency, but an identifier of the user at this location. This would be useful in cases where the user is known to have special needs in the event of an emergency, as well as simply locating users who do not have a permanent location. As such, the insertion of additional information into the UUI (User to User Information) field of the Integrated Services Digital Network (ISDN) call set up message header by communication device management module 109 may be employed to pass additional information to the PSAP. Accordingly, the UUI field of a user identification record associated with communication device 103 may be transmitted to a third party in order to locate communication device 103.

Alternatively, network jack 105 could be an intelligent jack (e.g., capable of being programmed to store the location information of communication device 103 in memory). For example, an intelligent jack could include an Electronic Programmable Read Only Memory (E-PROM). An SNMP read message could be sent to the intelligent jack to return a MIB update message with the location information for communication device 103 (e.g., meeting the requirements of an Emergency Response Location). The intelligent jack can have the location information loaded through communication device 105, a SNMP write from LAN switch 111, and/or programming during installation. Thus, there are many methods of populating the MIB structure in order to provide location information for communication device 103.

In the context of an emergency situation (if "911", or another emergency number, is dialed), communication device management module 109 may automatically transmit the information in the user identification record to the Public Safety Answering Point (PSAP). In an exemplary embodiment of the present invention, a user having communication device 103 dials "911". Communication device management module 109 recognizes that when "911" is dialed, PSAP must be contacted and the user identification record information is automatically transmitted to the PSAP. For example, communication device management module 109 transmits the Billed To Number in the Calling Line Identification (CLID) field of the user identification record to the PSAP. For example, communication device management module 109 can transmit an alternate Billed To Number corresponding to an identifiable Emergency Response Location in the CLID field of the user identification record to PSAP. As such, "stuffing" the alternate Billed To Number into the user identification field of the user identification record provides PSAP information for locating the user. Additional information (e.g., more specific location information) may be included in the User to User Information field of an ISDN call set-up header depending on the needs of communication system 101. Accordingly, the PSAP may respond with emergency personnel and locate the user who dialed "911". As such, communication system 101 can automatically provide internal location information of the user (e.g., using communication device 103) to emergency authorities in order to more quickly locate the user. Furthermore, communication system 101 may operate within and easily integrates into the current PSAP system with little or no modification to the PSAP system.

Figure 2:
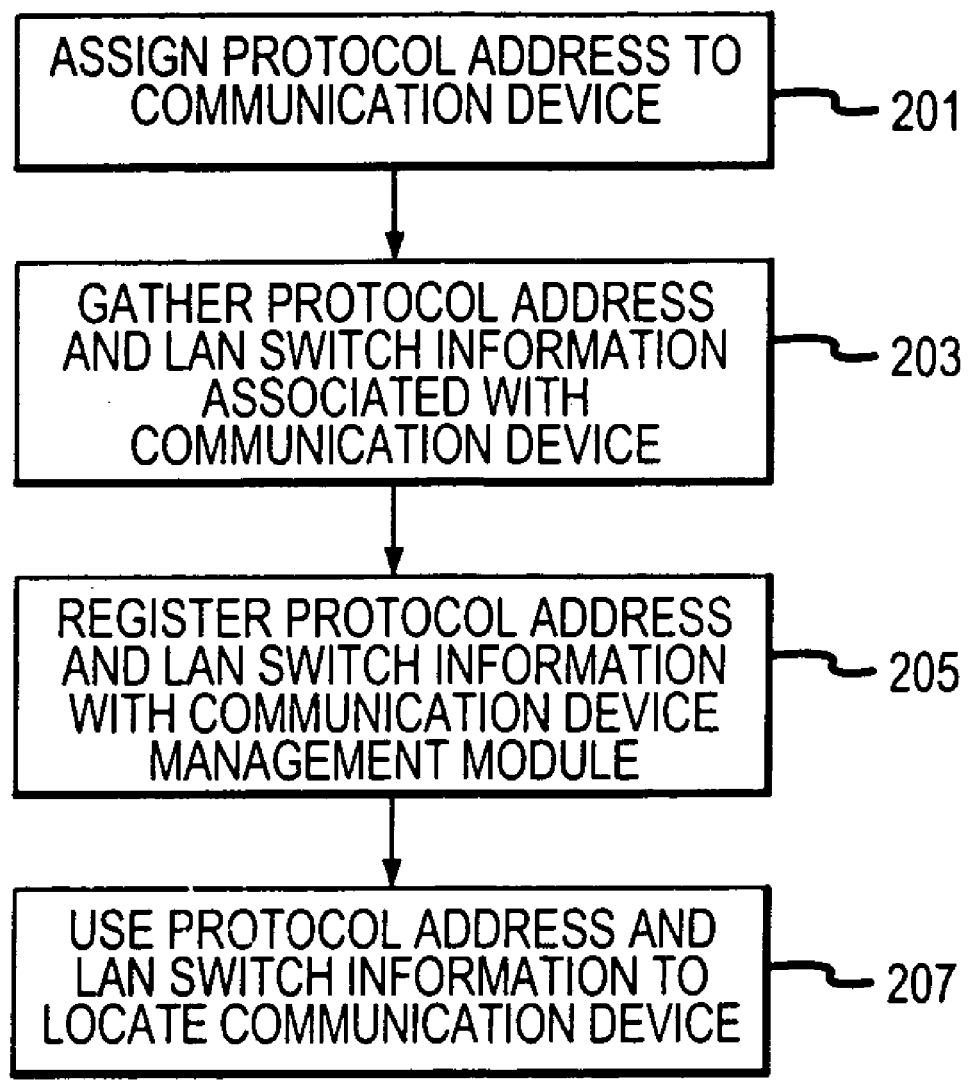
FIG. 2 illustrates a flowchart for a method for using Local Area Network (LAN) switch information of a communication device to determine a location of the communication device in accordance with an exemplary embodiment of the present invention.

FIG. 2 illustrates a flowchart for an exemplary method for using Local Area Network (LAN) switch information of a communication device to determine a location of the communication device in accordance with an exemplary embodiment of the present invention. A protocol address is assigned to communication device 103 (step 201). A dynamic internet protocol address may be assigned to communication device 103 via server 107 using DHCP. Protocol address and LAN switch information associated with communication device 103 are gathered (step 203). The dynamically assigned internet protocol address and LAN switch information associated with communication device 103 may be gathered via server 107 using DHCP and server 115 using TFTP. The protocol address and/or LAN switch information are registered with communication device management module 109 (step 205). A query may be sent to LAN switch 111 using a protocol in order to retrieve LAN switch information associated with communication device 103. A MIB structure may be created on LAN switch 111 to aid in providing the internet protocol address and/or LAN switch information associated with communication device 103 to communication device management module 109. The internet protocol address and/or LAN switch information may be retrieved from the MIB structure and provided to communication device management module 109 via a user identification record. The protocol address and/or LAN switch information are used to locate communication device 103 (step 207). The internet protocol address and/or LAN switch information may be transmitted from communication device management module 109 to a third party to aid in locating communication device 103 (e.g., a user using communication device 103). Thus, using Local Area Network (LAN) switch information associated with communication device 103 aids in determining the location of communication device 103.

It will be appreciated, that many applications of the present invention could be formulated. One skilled in the art will appreciate that one or more communication channels may include any system for exchanging data or transacting business, such as any hardware and/or software communication medium (e.g., telephone, modem, digital subscriber line, a global computer network, a wired link, a wireless link, any utility link), the Internet, an intranet, an extranet, WAN, LAN, satellite communications, and/or the like. It is noted that one or more communication channels may be implemented as any type of network, such as open network, secured network, an interactive television (ITV) network. Furthermore, one or more communication channels may be one network or multiple independent networks. The present invention could be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, or the like.

Communication system 101 communicates with one or more users by transmitting, transferring, or otherwise communicating with the user(s) via one or more communication channels. The computing units used by the user, the system (e.g., communication system 101), and/or the like may be connected with each other via one or more communication channels (e.g., a data communication network). The network may be a public network and assumed to be insecure and open to eavesdroppers. In the illustrated implementation, the network may be embodied as the Internet, an Ethernet, a Local Area Network, and/or the like. In this context, the computers may or may not be connected to the Internet at all times. For instance, the user computer may employ a modem to occasionally connect to the Internet, whereas the system's computing center might maintain a permanent connection to the Internet. Various systems and servers are suitably coupled to the network via data links. A variety of conventional communications media and protocols may be used for data links. For example, a connection to an Internet Service Provider (ISP) over the local loop is typically used in connection with standard modem communication, cable modem, Dish networks, ISDN, Digital Subscriber Line (DSL), or various wireless communication methods. The various systems might also reside within a local area network (LAN) which interfaces to the network via a leased line (T1, DS3, etc.). Such communication methods are well known in the art, and are covered in a variety of standard texts. See, e.g., GILBERT HELD, UNDERSTANDING DATA COMMUNICATIONS (1996), which is hereby incorporated by reference.

The system (e.g., communication system 101) may communicate the data to the user using at least one protocol in at least one format. For example, the system may configure the data in a format and communicate the data to the user using a protocol (e.g., using https and XML). Communication system 101 may also use any operative protocols defined by the International Telecommunication Union (ITU) and/or adapted by the American National Standards Institute (ANSI). In one exemplary embodiment of the present invention, the system and the user may have a predetermined protocol and format in order to facilitate the communication of the data between them.

Exemplary protocols include Q931, Session Initiation Protocol (SIP), Session Description Protocol (SDP), H323, Media Description Control Protocol, Gateway Control Protocol, hyper text transfer protocol (http), secured hyper text transfer protocol (https), file transfer protocol, secure electronic mail, a network, remote method invocation, distributed component object model, enterprise java bean, and/or socket communication. One embodiment of the present invention may be implemented with TCP/IP communications protocols, IPX, Appletalk, IP-6, NetBIOS, OSI or any number of existing or future protocols. Specific information related to the protocols, standards, and application software utilized in connection with the Internet may not be discussed herein. For further information regarding such details, see, for example, DILIP NAIK, INTERNET STANDARDS AND PROTOCOLS (1998); DEBORAH RAY AND ERIC RAY, MASTERING HTML 4.0 (1997). LOSHIN, TCP/IP CLEARLY EXPLAINED (1997). All of these texts are hereby incorporated by reference.

Exemplary formats include extensible markup language (XML), name value pair, any custom format, any industry standard format, and/or the like. For example, XML is a markup language for documents including structured information. Structured information includes content (e.g., words, pictures, and/or the like) and some indication of the type of content (e.g., heading, footnote, figure, database table, etc.). In this manner, a markup language can identify structures in a document (e.g., by adding markup to the document). Documents include, for example, traditional documents, vector graphics, electronic commerce transactions, mathematical equations, object meta-data, server Application Programming Interfaces, and/or the like. The XML language (e.g., XML schemas) may describe and constrain the content of XML documents.

In order to further describe the present invention, the following provides further exemplary embodiments for the various elements of the present invention. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in data tables. A "key field" partitions the database according to the high-level class of objects defined by the key field. For example, a certain class may be designated as a key field in both the first data table and the second data table, and the two data tables may then be merged on the basis of the class data in the key field. In this exemplary embodiment, the data corresponding to the key field in each of the merged data tables is preferably the same. However, data tables having similar, though not identical, data in the key fields may also be merged by using AGREP, for example. Also, the association of XML data is done using Document Type Definition (DTD) and schemas.

A database call may include, e.g., back-up data, tracking information, and/or the like. A database may be any type of database, such as relational, hierarchical, object-oriented, and/or the like. Common database products that may be used to implement each database include DB2 by IBM (White Plains, N.Y.), any of the database products available from Oracle Corporation (Redwood Shores, Calif.), Microsoft SQL Server by Microsoft Corporation (Redmond, Wash.), or any other database product. Each database may be organized in any suitable manner, including as data tables or lookup tables.

Communication between the various entities and the system of the present invention is accomplished through any suitable communication means, such as, for example, a telephone network, Intranet, Internet, Local Area Network, Ethernet, point of interaction device (smart card system, point of sale device, personal digital assistant, cellular phone, kiosk, etc.), online communications, off-line communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

Each entity may use a computing system to facilitate online commerce transactions, location information shared between entities for verification, taxation, and/or fraud analysis, and/or the like. For example, information may be shared between entities for security, authentication, prevention or detection of fraud, and/or the like. The user may use a computing unit in the form of a personal computer, although other types of computing units may be used including laptops, notebooks, hand held computers, set-top boxes, and the like. Communication system 101 may use a computing unit implemented in the form of a computer server, a computing center (e.g., a main frame computer), a mini-computer, a PC server, a network set of computers, and/or the like.

Optionally, a user computing unit, communication system 101, and/or the like may be interconnected via a second network, such as a payment network or a public network (e.g., the Internet). The payment network represents existing proprietary networks that presently accommodate transactions for credit cards, debit cards, and other types of financial/banking cards. The payment network is a closed network that is assumed to be secure from eavesdroppers. Examples of the payment network include the American Express®, VisaNet® and the Veriphone® network.

In the foregoing specification, the invention has been described with reference to specific embodiments. However, it will be appreciated that various modifications and changes can be made without departing from the scope of the present invention as set forth in the claims below. The specification and figures are to be regarded in an illustrative manner, rather than a restrictive one, and all such modifications are intended to be included within the scope of present invention. Accordingly, the scope of the invention should be determined by the appended claims and their legal equivalents, rather than by the examples given above. For example, the steps recited in any of the method or process claims may be executed in any order and are not limited to the order presented in the claims.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

What is claimed is:

1. A communication system, comprising:
    a communication device capable of communication with a service, wherein the service assigns a protocol address to the communication device; and
    a communication device management module in communication with the communication device for facilitating registration of the communication device with the communication device management module, wherein the communication device management module receives at least one of the protocol address and Local Area Network switch information in order to locate the communication device, and wherein the system transmits a Calling Line Identification field of a user identification record associated with the communication device to a third party in order to locate the communication device.

2. The communication system of claim 1, further comprising a management information base structure on a LAN switch coupled to the communication device and the communication device management module to aid in providing at least one of the protocol address and the LAN switch information associated with the communication device to at least one of the communication device management module and the communication device.

3. A communication system, comprising:
    an internet protocol phone capable of communication with a service, wherein the service dynamically assigns an internet protocol address to the internet protocol phone; and a phone management module in communication with the internet protocol phone for registering the internet protocol phone with the phone management module, wherein the phone management module receives at least one of the protocol address and Local Area Network switch information in order to locate the internet protocol phone, and wherein the system transmits a Calling Line Identification field of a user identification record associated with the internet protocol phone to a third party in order to locate the internet protocol phone.

4. A method of facilitating locating a communication device, comprising the steps of:
registering at least one of the protocol address and LAN switch information associated with the communication device with a communication device management module;
using at least one of the protocol address and LAN switch information to locate the communication; and
transmitting a Calling Line Identification field of a user identification record associated with the communication device to a third party in order to locate the communication device.

5. The method of claim 4, further comprising the step of creating a management information base structure on the LAN switch to aid in providing at least one of the protocol address and the LAN switch information associated with the communication device to the communication device management module.

6. The method of claim 5, further comprising the steps of:
gathering the protocol address and LAN switch information associated with the communication device;
retrieving at least one of the protocol address and the LAN switch information from the management information base structure; and
providing at least one of the protocol address and the LAN switch information to the communication device management module via a user identification record associated with the communication device.

7. A method of facilitating locating an internet protocol phone, comprising the steps of:
registering the internet protocol phone with a phone management module, wherein the phone management module receives at least one of the dynamic internet protocol address and Local Area Network switch information associated with the internet protocol phone from the internet protocol phone;
transmitting at least one of the dynamic internet protocol address and the Local Area Network switch information from at least one of the phone management module and the communication device to a third party in order to locate the internet protocol phone; and
transmitting a Calling Line Identification field of a user identification record associated with the internet protocol phone to a third party in order to locate the internet protocol phone.

8. The method of claim 7, further comprising the steps of:
gathering the dynamic internet protocol address and Local Area Network switch information associated with the internet protocol phone; and
querying a LAN switch in order to retrieve and register the LAN switch information associated with the internet protocol phone with the phone management module.

9. A method of facilitating locating a communication device by registering a network jack with a Local Area Network switch, comprising the steps of:

capturing information associated with the network jack on the communication device;
transmitting the information associated with the network jack to the Local Area Network switch;
associating the information associated with the network jack with the Local Area Network switch information;
storing the information associated with the network jack and the Local Area Network switch information on the Local Area Network switch; and
using at least one of the protocol address associated with the network jack and the Local Area Network switch information to locate the communication device.

10. The method of claim 9, further comprising entering a textual location of the network jack on the communication device.

11. The method of claim 9, further comprising capturing the Global Positioning System coordinates of the location of the network jack on the communication device.

12. A communication system, comprising:
a communication device capable of communication with a service, wherein the service assigns a protocol address to the communication device; and
a communication device management module in communication with the communication device for facilitating registration of the communication device with the communication device management module, wherein the communication device management module receives at least one of the protocol address and Local Area Network switch information in order to locate the communication device, and
wherein the system transmits a User to User Identification field of a user identification record associated with the communication device to a third party in order to locate the communication device.

13. The communication system of claim 12, further comprising a management information base structure on a LAN switch coupled to the communication device and the communication device management module to aid in providing at least one of the protocol address and the LAN switch information associated with the communication device to at least one of the communication device management module and the communication device.

14. A communication system, comprising:
an internet protocol phone capable of communication with a service, wherein the service dynamically assigns an internet protocol address to the internet protocol phone; and
a phone management module in communication with the internet protocol phone for registering the internet protocol phone with the phone management module, wherein the phone management module receives at least one of the protocol address and Local Area Network switch information in order to locate the internet protocol phone, and
wherein the system transmits a User to User Identification field of a user identification record associated with the internet protocol phone to a third party in order to locate the internet protocol phone.

15. A method of facilitating locating a communication device, comprising the steps of:
registering at least one of the protocol address and LAN switch information associated with the communication device with a communication device management module;
using at least one of the protocol address and LAN switch information to locate the communication device; and transmitting a User to User Identification field of a user identification record associated with the communication device to a third party in order to locate the communication device.

16. The method of claim 15, further comprising the step of creating a management information base structure on the LAN switch to aid in providing at least one of the protocol address and the LAN switch information associated with the communication device to the communication device management module.

17. A method of facilitating locating an internet protocol phone, comprising the steps of:

registering the internet protocol phone with a phone management module, wherein the phone management module receives at least one of the dynamic internet protocol address and Local Area Network switch information associated with the internet protocol phone from the internet protocol phone;

transmitting at least one of the dynamic internet protocol address and the Local Area Network switch information from at least one of the phone management module and the communication device to a third party in order to locate the internet protocol phone; and transmitting a User to User Identification field of a user identification record associated with the internet protocol phone to a third party in order to locate the internet protocol phone.

* * * * *